United States Patent
Takizawa

(10) Patent No.: US 7,669,196 B2
(45) Date of Patent: Feb. 23, 2010

(54) DATA PROCESSING SYSTEM, DATA GENERATING DEVICE AND DATA OUTPUTTING DEVICE

(75) Inventor: Hidetoshi Takizawa, Nara (JP)

(73) Assignee: Sharp Corporation, Osaka-shi (JP)

( * ) Notice: Subject to any disclaimer, the term of this patent is extended or adjusted under 35 U.S.C. 154(b) by 950 days.

(21) Appl. No.: 11/185,864

(22) Filed: Jul. 21, 2005

(65) Prior Publication Data

US 2006/0020922 A1  Jan. 26, 2006

(30) Foreign Application Priority Data

Jul. 23, 2004  (JP)  ............................ 2004-215939

(51) Int. Cl.
G06F 9/445 (2006.01)
G06F 15/173 (2006.01)
G06F 15/00 (2006.01)

(52) U.S. Cl. ...................... 717/170; 717/172; 717/173; 709/229; 358/1.14; 358/1.15

(58) Field of Classification Search ...................... None
See application file for complete search history.

(56) References Cited

U.S. PATENT DOCUMENTS

| | | | | |
|---|---|---|---|---|
| 5,436,730 | A * | 7/1995 | Hube | 358/401 |
| 7,158,253 | B2 * | 1/2007 | Matoba | 358/1.15 |
| 7,207,734 | B2 * | 4/2007 | Yamada et al. | 400/63 |
| 7,209,984 | B2 * | 4/2007 | Orito | 710/52 |
| 7,227,656 | B1 * | 6/2007 | Kato | 358/1.15 |
| 2002/0101611 | A1 * | 8/2002 | Shima | 358/1.15 |
| 2002/0131069 | A1 * | 9/2002 | Wanda | 358/1.14 |
| 2002/0140966 | A1 * | 10/2002 | Meade et al. | 358/1.15 |
| 2003/0025932 | A1 * | 2/2003 | Chiba et al. | 358/1.15 |
| 2003/0234950 | A1 * | 12/2003 | Lay | 358/1.14 |
| 2006/0156071 | A1 * | 7/2006 | Yu | 714/44 |

FOREIGN PATENT DOCUMENTS

| | | |
|---|---|---|
| JP | 4-347733 A | 12/1992 |
| JP | 2003-216375 A | 7/2003 |
| JP | 2004-126965 A | 4/2004 |

* cited by examiner

Primary Examiner—Tuan Q Dam
Assistant Examiner—Isaac T Tecklu
(74) Attorney, Agent, or Firm—Birch, Stewart, Kolasch & Birch, LLP

(57) ABSTRACT

A data processing system including a data generating device and a data outputting device. The data generating device includes: a generation program updating section for updating the version of the generation program, which causing a computer to generate data, from a current version to a next version. The data outputting device includes: a receiving section for receiving data from the data generating devices, a data accumulating section for accumulating data received at the receiving section; an outputting section for processing and outputting data in the data accumulating section in accordance with the output program executed by the computer; an output program updating section for updating the version of the output program from a current version to a next version; a compatibility determining section for determining the compatibility between the next-version output program and data in the data accumulating section before the output program is updated; and a controlling section for determining an operation to perform on data in the data accumulating section based on the result of the determination by the compatibility determining section.

18 Claims, 13 Drawing Sheets

Fig.5

| NAME OF JOB | TRANSMISSION-SOURCE IP ADDRESS | AUTHENTICATION REQUIREMENT | RESOLUTION (DPI) | USED FUNCTION |
|---|---|---|---|---|
| TECHNOLOGY AND PLANNING MEETING RECORD | 192.168.0.22 | ABSENT | 600 | ABSENT (STANDARD) |
| MANAGEMENT-STRATEGY CONFERENCE | 192.168.0.100 | ABSENT | 600 | BINDING MARGIN |
| PROMOTION SCHEDULE OF COMMODITY PRODUCTY | 192.168.1.165 | ABSENT | 600 | WATER MARK |
| PERSONAL SHIFT BUSINESS CASE (DRAFT) | 192.168.8.4 | PRESENT | 600 | ABSENT (STANDARD) |
| WATCH OF TECHNICAL-TREND | 192.168.0.99 | ABSENT | 1200 | COLOR ADJUSTMENT |

Fig.6

| DRIVER VERSION | VERSION OF PRINTING-CONTROL PROGRAM | FUNCTION 1: COLOR ADJUSTMENT | FUNCTION 3: WATER MARK | FUNCTION 3: WATER MARK | FUNCTION 4: 1200 DPI PRINTING |
|---|---|---|---|---|---|
| V1.62 | F1.10 | NO UPDATE | UPDATE | FUNCTION | FUNCTION |
| V1.61 | F1.09 | — | — | FUNCTION | FUNCTION |
| V1.58 | F1.08 | — | — | FUNCTION | NOT FUNCTION |
| V1.57 | F1.07 | — | — | FUNCTION | FUNCTION |

Fig.7

| NAME OF JOB | TRANSMISSION-SOURCE IP ADDRESS | AUTHENTICATION REQUIREMENT | RESOLUTION (DPI) | USED FUNCTION | DRIVER VERSION |
|---|---|---|---|---|---|
| TECHNOLOGY AND PLANNING MEETING RECORD | 192.168.0.22 | ABSENT | 600 | ABSENT (STANDARD) | V1.58 |
| MANAGEMENT-STRATEGY CONFERENCE | 192.168.0.100 | ABSENT | 600 | BINDING MARGIN | V1.62 |
| PROMOTION SCHEDULE OF COMMODITY PRODUCTY | 192.168.1.165 | ABSENT | 600 | WATER MARK | V1.58 |
| PERSONAL SHIFT BUSINESS CASE (DRAFT) | 192.168.8.4 | PRESENT | 600 | ABSENT (STANDARD) | V1.57 |
| WATCH OF TECHNICAL-TREND | 192.168.0.99 | ABSENT | 1200 | COLOR ADJUSTMENT | V1.62 |

Fig.14

| NAME OF JOB | MANAGEMENT-STRATEGY CONFERENCE DOCUMENT |
| --- | --- |
| USER-AUTHENTICATION | UNNECESSARY |
| DATE OF JOB GENERATION | 2004/05/20 9:55:00 |

THIS HOLD JOB WILL BE ERASED FOR UPDATING VERSION OF PROGRAM FOR THE PRINTER.

Fig.15

| NAME OF JOB | PERSONAL SHIFT BUSINESS CASE (DRAFT) |
| --- | --- |
| USER-AUTHENTICATION | NECESSARY |
| DATE OF JOB GENERATION | 2004/05/20 9:55:00 |

PROGRAM FOR PRINTER WILL BE VERSION-UPDATED LATER. THEREFORE, PLEASE, PERFORM "PRINTING" OR "ERASING" OPERATION BY "DATE OF TIME LIMIT"

| DATE OF TIME LIMIT | 2004/05/22 10:25:00 |
| --- | --- |

DATA PROCESSING SYSTEM, DATA GENERATING DEVICE AND DATA OUTPUTTING DEVICE

CROSS-REFERENCE TO RELATED APPLICATION

This application is related to Japanese Patent Application No. 2004-215939 filed on Jul. 23, 2004, whose priority is claimed and the disclosure of which is incorporated by reference in its entirety.

BACKGROUND OF THE INVENTION

1. Field of the Invention

The present invention relates to a data processing system including a data generating device for generating data and a data outputting device connected to the aforementioned device through a transferring section for outputting data, a data generating device and a data outputting device.

2. Description of the Related Art

There are devices and systems which generate, process and output data, wherein plural processes for generating data to outputting data are executed through a plurality of data processing sections or a plurality of devices. Further, some of these devices or systems are configured such that at least sections of the respective processes are executed by computers, programs enabling the computers to execute the processes are distributed among the plurality of data processing sections or devices and stored in their respective storage devices, and these programs are individually updated (version-updated). An example of such a data processing system is a print-data processing system constituted by a printer driver and a printer. The purposes of version updating are addition of new functions after the releases of programs, enhancement of functions, enhancement of performance, repairs of malfunctions found after release.

A first point to be noted in updating the versions is that, when updating of the versions involves changes in the functions supported by the respective data processing sections, the supported functions must be compatible throughout the processes for generating data to for outputting data. If functions required for data processing are not supported at some processes or the version compatibility is lost due to updating of the versions, this may make it impossible to normally output data. Regarding this, there is known a method in which a printer driver acquires the version of a control program for a printer device which outputs data, and only functions supported by both the printer driver and the printer control program are displayed on a user interface of the printer driver while functions which are not supported by them are not displayed on the user interface (refer to, for example, Japanese Unexamined Patent Application No. 2003-216375).

Further, there is known a method in which a printer driver and a printer include a common color module and they are brought into synchronization with each other such that the versions of their programs are compatible (refer to, for example, Japanese Unexamined Patent Application No. 2004-126965).

When programs are version-updated in the aforementioned data processing system, in the case where the respective processes for generating, processing and outputting data are to be successively executed in the system, the version updating may be performed after all the data processing in the system has been completed. Thereafter, data is generated and processed by the version-updated programs with maintained compatibility. However, there are aspects where data is accumulated once in the system and the accumulated data is output when necessary, depending on the system or data.

For example, in an aspect, in the case where the data processing system is constituted by the aforementioned printer driver and the printer, print data is accumulated in the printer and the accumulated data is output when a command is newly generated.

In such a system, if the programs are version-updated when data is still accumulated, the programs are version-updated halfway through the processes for generating to outputting the aforementioned data and therefore the version compatibility among the programs for processing data can not be maintained, thus preventing data from being normally output. Conventionally, such inconvenience has been avoided by human care. Namely, operational contrivances have been utilized as follows. For example, a person in charge of program-version-updating (for example, a field engineer or a system administrator) provides a notification to a user of the system in a suitable spare moment, then the user who received the notification outputs accumulated data during this moment and then the person in charge of version-updating conducts version-updating after the accumulated data in the system is removed. However, if the number of devices connected to a network increases with advancing popularization of the network, this will increase the difficulty of concurrently updating the versions and also increase the frequency of version updating, thus increasing the burden of the administration. There is a need for systems capable of treating data such that inconvenience caused by version updating can be avoided, by taking account of accumulated data.

SUMMARY OF THE INVENTION

The present invention provides a data processing system which, when updating the versions of a data-generation program and a data-output program under conditions where there is accumulated data in the system, can avoid inconvenience that data can not be normally processed due to version incompatibility between the data generation program and the output program.

The present invention provides a data processing system comprising a data generating device and a data outputting device, wherein the data generating device comprises: a commanding section for generating a command for generating data; a first storage section for storing a generation program for causing a computer to generate data; a data generating section for generating data in accordance with the program executed by the computer; a data transmitting section for transmitting the generated data; and a generation program updating section for updating the version of the generation program from a current version to a next version, and the data outputting device comprises: a receiving section for receiving data from the data generating devices, the receiving section being connected to one or more data generating devices through a data transferring section; a data accumulating section for accumulating data received at the receiving section; a second storage section for storing an output program for causing a computer to execute an outputting process that corresponds to the data generation process; an outputting section for processing and outputting data in the data accumulating section in accordance with the output program executed by the computer; an output program updating section for updating the version of the output program from a current version to a next version; a compatibility determining section for determining the compatibility between the next-version output program and data in the data accumulating section before the output program is updated; and a controlling section for determining an operation to perform on data in the data accumulating section based on the result of the determination by the compatibility determining section.

In the data processing system according to the present invention, the outputting device includes a compatibility determining section for determining the compatibility between the next-version output program and data in the data accumulating section before the output program is version-updated, and a controlling section for determining the an operation to perform on the accumulated data on the basis of the result of the determination by the compatibility determining section. Therefore, when the output program is version-updated, data maintaining the version compatibility can be retained while only data which does not maintain the version compatibility can be processed, thus correctly processing the accumulated data. This can avoid malfunctions in the output data caused by version incompatibility.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 5 is an explanation view illustrating an exemplary controlling table which is held within the printer according to the present invention for controlling hold jobs;

FIG. 6 is an explanation view illustrating exemplary information acquired by the compatibility determining section according to the present invention (second embodiment);

FIG. 7 is an explanation view illustrating an exemplary controlling table including the version information of the printer driver (second embodiment);

FIG. 14 is an explanation view illustrating an exemplary notification massage displayed on the screen of the PC; and FIG. 15 is an explanation view illustrating an exemplary notification for urging the user to print confidential hold jobs by a time limit.

DETAILED DESCRIPTION OF THE INVENTION

Figure 1:
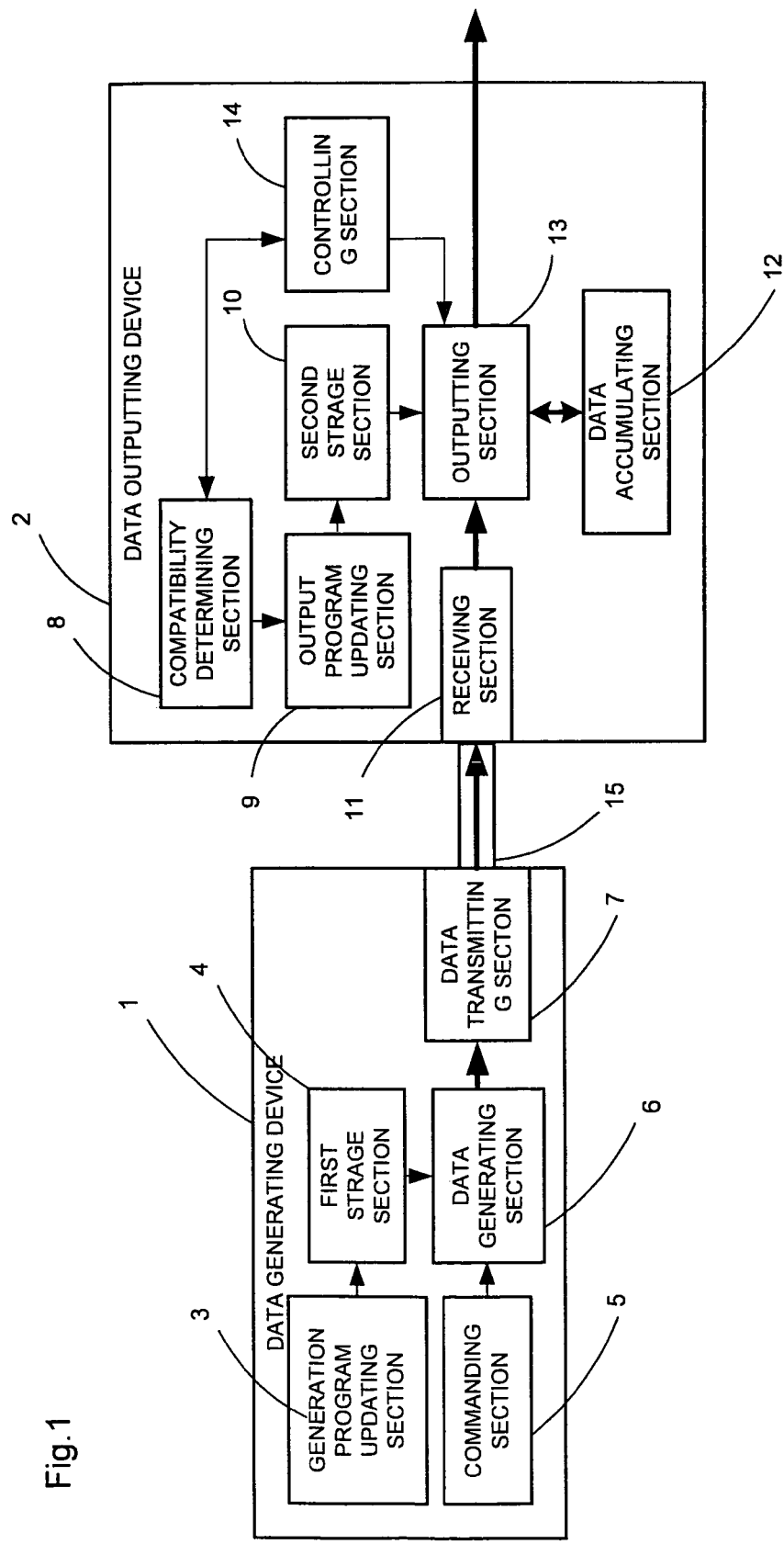
FIG. 1 is a block diagram illustrating the structure of a data processing system according to the present invention.

A data processing system according to the present comprises a data generating device and a data outputting device, wherein the data generating device comprises: a commanding section for generating a command for generating data; a first storage section for storing a generation program for causing a computer to generate data; a data generating section for generating data in accordance with the program executed by the computer; a data transmitting section for transmitting the generated data; and a generation program updating section for updating the version of the generation program from a current version to a next version, and the data outputting device comprises: a receiving section for receiving data from the data generating devices, the receiving section being connected to one or more data generating devices through a data transferring section; a data accumulating section for accumulating data received at the receiving section; a second storage section for storing an output program for causing a computer to execute an outputting process that corresponds to the data generation process; an outputting section for processing and outputting data in the data accumulating section in accordance with the output program executed by the computer; an output program updating section for updating the version of the output program from a current version to a next version; a compatibility determining section for determining the compatibility between the next-version output program and data in the data accumulating section before the output program is updated; and a controlling section for determining an operation to perform on data in the data accumulating section based on the result of the determination by the compatibility determining section.

Here, the data processing system is a system for generating, processing and outputting data through a plurality of processes and includes, for example, a print-data processing system constituted by a printer driver and a printer. However, the data processing systems is not limited thereto and may be a digital copier constituted by an image scanner and a printer or a system constituted by an image scanner, a filing device and a display device or a printer. Also, it may be a system for compressing data at the transmission side and then transferring it to the reception side where it is decompressed. Further, the data generating device and the data outputting device may be either individually placed and operated or placed within a single cabinet. Also, for example, the data accumulating section of the data outputting device may exist as a device independent of the remainder sections such as the outputting section and may be connected to the outputting section through data-transferring means.

The content of data may be, for example, image data. However, it is not limited thereto and may be character code data or numerical data. The data transferring section may be a network connecting between the respective devices. However, it is not limited thereto and may be any components capable of transferring signals. For example, the data transferring section may be a USB, a SCSI for transferring data within an apparatus or a PCI bus for transferring data mainly among circuit boards.

In the aforementioned data processing system, the data outputting device may be a printer, the generation program may be a program for a printer driver that generates print data to be transferred to the printer, and the output program may be a print program for the printer.

The operations determined by the controlling section may include erasure of data in the data accumulating section. This can avoid inconvenience that the outputting process is executed to output data under conditions where there is version incompatibility.

Also, the operations determined by the controlling section may include forced output of data in the data accumulating section in accordance with the current-version output program. In this case, since the generated data is subjected to the outputting process with the output program compatible therewith and then the program is version-updated, the version-updating can be achieved without losing the generated data.

Also, the commanding section or the data generating section may add, to data, command information for accumulating data in the data accumulating section when a user generates an accumulation command, the receiving section may accumulate the data to which the command information is added, and the outputting section may output the data from the data accumulating section on receiving an output command from the user.

The output program updating section may acquire supported function information of the next version output program which is provided along with the program, the compatibility determining section may compare the supported function information acquired by the output program updating section with supported function information of the current version output program which has been retained since the updating to the current version output program and, if supported functions of the current version output program include a function which is not supported by the next version output program, all the data accumulated in the data accumulating section is processed. Thus, when there is a function which will not be supported after version updating, it is possible to process all data which may utilize this function.

Further, the data generating section may add version information of the generation program to data generated in accordance with this version of the program, the output program updating section may acquire information about the compatibility between the version of the next-version output program and the version of the generation program, the information being provided along with the next-version output program, and the compatibility determining section may compare the information acquired by the output program updating section with the version information of each data and judges data generated by a generation program which is incompatible with the next-version output program as being incompatible. In this case, even when the generation program is updated first and then data is generated at the updated version and accumulated in the accumulating section, it is possible to make a determination that the output of the data should be held until the output program is version-updated. This enables outputting the data by correctly determining the compatibility, even when the generation program and the output program are concurrently version-updated.

Further, the data outputting device may include a display section for displaying an operation to perform on data which is judged as being incompatible by the compatibility determining section. In such a case, when data is erased in updating the version, the fact is displayed on the outputting device, thus preventing inconvenience that the person who conducts version-updating erases data without knowing the existence of the data.

Also, the data outputting device may further include a notification section for notifying the data generating device, the commanding section or the data generating section may add, to data, identification information for identifying the data generating device which generated a command for generating the data, and the data outputting device may notify, about an operation to perform on data judged as being incompatible by the compatibility determining section, the data generating device which is identified from the identification information of this data. In this case, when data is erased in order to update the version, a notification is provided to the terminal used for generating the data for informing the user that the data will be erased. This can prevent inconvenience that data is erased before the user recognizes that.

The notification may indicate, for example, data to be processed, out of the accumulated data. Also, it may simply indicate the erasure of the data to be processed or may urge the user to select erasure or interruption of version-updating. Also, it may urge the user to output the accumulated data to be processed.

The data outputting device may further include a time-limit setting section for determining the time limit for holding the processing of data, the notification section may provide a notification including the set time limit, the controlling section may process the aforementioned data after the time limit, and the outputting-process updating section may update the version of the output program after the data is processed. In such a case, a notification can urge the user to output the accumulated data until the time limit for version updating, thus reducing the accumulated data before updating the version. This can reduce the burden on humans required for processing of accumulated data in version-updating or can reduce data to be erased. Further, this enables quickly completing the version-updating operation.

Further, the data outputting device may further include a notification-timing control section for indicating the timing of notification, and the notification section may provide a notification when the notification-timing control section indicates the timing of notification. This enables urging the user to output accumulated data by providing a notification at a proper timing.

Further, the notification-timing control section may cause the notification section to provide a notification at a predetermined time interval until the number of notifications reaches a predetermined number. This enables repeatedly providing a notification at periodic intervals or providing a notification when the time limit is set or just before the time limit comes.

Further, the commanding section or the data generating section may add user-authentication requirement information to data when a user generates a user-authentication requirement command, the outputting section may output the data to which the user-authentication requirement information is added, on receiving authentication from the user, and the controlling section may exclude the data with user-authentication requirement information added thereto from data to be forcibly output. In this case, when there is accumulated confidential data with a user-authentication requirement attached thereto, it is possible to avoid inconvenience that the data is forcibly printed without authentication, in version-updating.

Further, the notification section may provide a notification only for data to which user-authentication requirement information is added. In this case, a notification is provided for confidential data thereby reducing urging notifications, while notifications can be certainly provided for confidential data which requires notifications in order to cause the user to notice it.

In another aspect, the present invention provides a data generating device comprising: a generating section for generating a command for generating data which is to be transferred to a data outputting device and outputted, the data outputting device being connected to the generating section through a transferring section; a first storage section for storing a generation program for causing a computer to generate data; a data generating section for generating data in accordance with the program executed by the computer; a data transmitting section for transmitting the generated data; and an information adding section for adding, to data, information which enables the outputting device to determine whether the version of the output program for executing an outputting process is compatible with the generation process and process the data.

Further, the present invention provides a data outputting device comprising: a data accumulating section for accumulating data which has been generated by a data generating device and then received, the data generating device being connected to the data outputting device through a transferring section; a second storage section for storing an output program for causing a computer to execute an outputting process that corresponds to a data generation process in the data generating device; an outputting section for processing and outputting data in the data accumulating section in accordance with the output program executed by the computer; an output program updating section for updating the version of the output program from a current version to a next version; a compatibility determining section for determining the compatibility between the next-version output program and the accumulated data before the output program is updated; and a controlling section for determining an operation to perform on data in the data accumulating section based on the result of the determination by the compatibility determining section.

Hereinafter, the present invention will be described on the basis of embodiments thereof illustrated in the drawings.

DESCRIPTION OF THE PREFERRED EMBODIMENTS

FIG. 1 is a block diagram illustrating the structure of a data processing system according to the present invention. As illustrated in FIG. 1, the system according to the present invention is constituted by a data generating device 1, a data outputting device 2 and a transferring section 15 connected between these devices for transferring data. The data generating device 1 includes a commanding section 5 for generating a command for generating data, a data generating section 6 for generating data in response to the command of the commanding section 5, a data transmitting section 7 for transmitting the generated data to the data outputting device 2 through the transferring section 15, a first storage section 4 for storing programs of processes to be executed by the data generating section 6 and a generation program updating section 3 for updating the programs stored in the first storage section 4. On the other hand, the data outputting device 2 includes a receiving section 11 for receiving data transmitted through the transferring section 15, a data accumulating section 12 for accumulating the received data, an outputting section 13 for processing data received or data accumulated in the data accumulating section 12 and then outputting the processed data, a second storage section 10 for storing programs of processes to be executed by the outputting section 13, an output program updating section 9 for updating the programs stored in the second storage section 10, a compatibility determining section 8 for determining the compatibility of the next-version output program with the data in the data accumulating section 12 prior to updating of the output program, and a control section 14 for determining an operation to perform on data on the basis of the result of determination by the compatibility determining section 8.

The data generating device 1 may be constituted by, for example, a microcomputer, a storage device such as a flash memory for accumulating programs to be executed by the microcomputer, a RAM for operations for processing data, and electronic circuits for executing data-transferring processes for transmitting data or other processes. Out of these components, at least the processes of the data generating section are executed by causing the computer to execute the programs stored in the first storing section. The data outputting device 2 may be constituted by, for example, a microcomputer, a storage device such as a flash memory for accumulating programs to be executed by the microcomputer, a RAM for operations for processing data, a storage device such as a hard disk for accumulating data, and electronic circuits for executing data-reception process for receiving data or other processes. Out of these components, at least the processes of the data outputting section are executed by causing the computer to execute the programs stored in the second storing section.

Although embodiments will be described in more detail below by exemplifying cases where the data generation programs for the data processing system are process programs for a printer driver for generating print data to be transferred to a printer and the output programs are printing control programs for the printer, the present invention is not limited thereto. Those skilled in the art will easily apply the present invention to other uses.

First Embodiment

Figure 2:
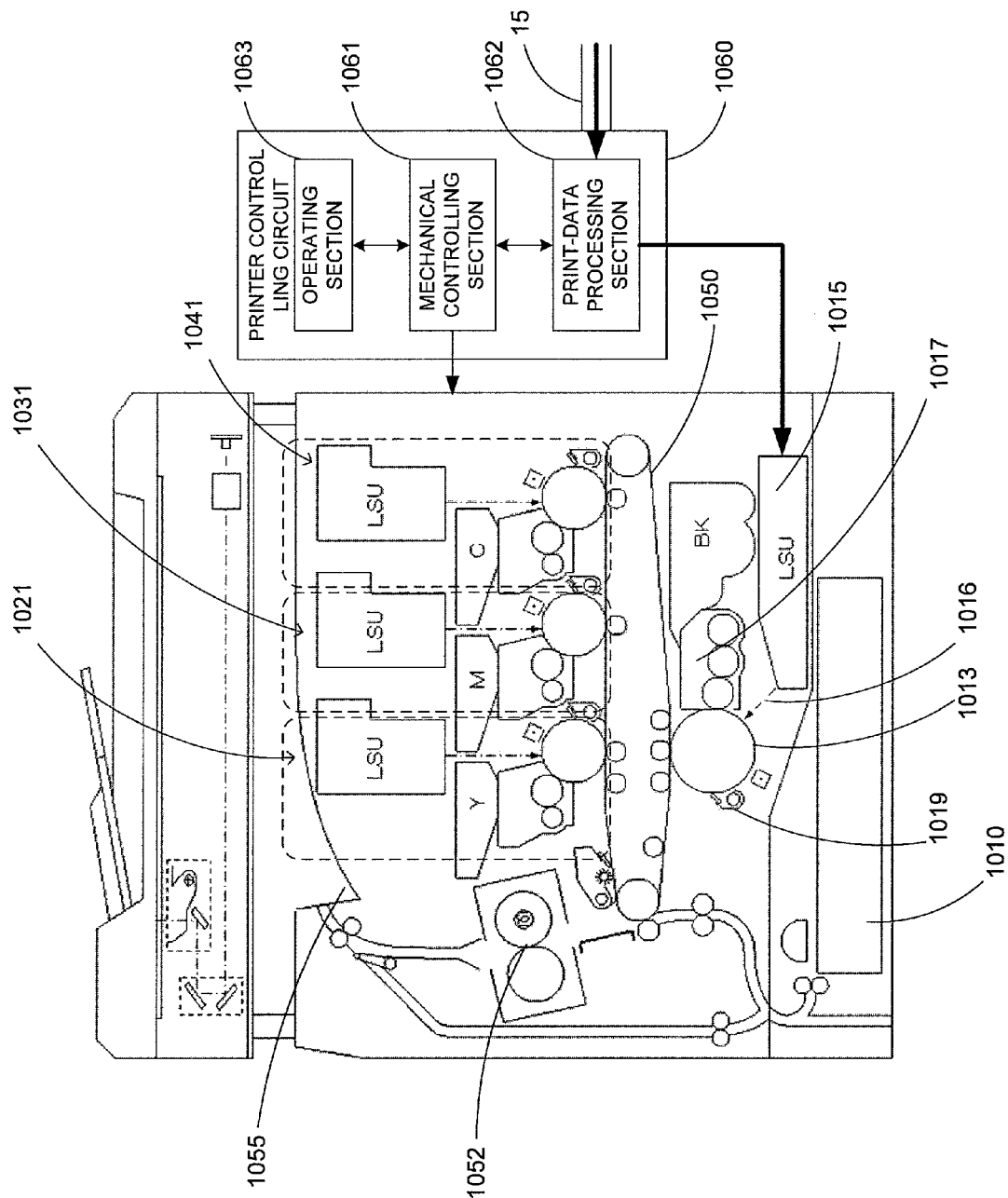
FIG. 2 is an explanation view illustrating the structure of a multi-function unit including an electrophotographic-type full-color printer according to an embodiment of the outputting device according to the present invention.

FIG. 2 is an explanation view illustrating the structure of a multi-function unit including an electrophotographic-type full-color printer according to an embodiment of the output device. Print data transmitted from the transferring section 15 is processed by a print-data processing section 1062 in a printer controlling circuit 1060. The print-data processing section 1062 includes at least a section of the outputting section 13, the receiving section 11 and the data accumulating section 12 of FIG. 1. Also, a mechanical controlling section 1061 may include at least a portion of the outputting section 13. This is because the outputting of print data may also relate to processes, paper feeding or controlling of a printer operating section 1063. Out of print data processed by the print-data processing section 1062, black data is input to a laser device (not shown) in a laser-scanning unit (hereinafter, referred to as an LSU) 1015. Laser light 1016 from the laser-scanning unit 1015 is scanned over the surface of a photosensitive body 1013 to generate an electrostatic latent image on the surface of the photosensitive body 1013. The generated electrostatic latent image is developed by a developing section 1017 and toner is adhered to the image regions. The toner adhered to the image regions of the surface of the photosensitive body is transferred to a transferring belt 1050 at a first transferring section 1019. Black print data has been described hereinbefore. For color data, the same image-generating process is performed for respective colors of yellow (Y), magenta (M) and cyan (C), and toners are transferred to the transferring belt 1050. These processes for the respective YMC colors are performed by image-generating units 1021, 1031, 1041 placed within a rectangular shape drawn by a dot line. The toners of the respective colors transferred to the transferring belt 1050 and superimposed on one another thereon are transferred to a sheet of paper fed from a paper tray 1010 at a second transferring section 1052 and then fused in a fixing section 1052. The portions of the paper on which the respective colors are laminated are exposed to the heat of the fixing section and thus the toners are fused, thus mixing and fixing the colors on the paper. The paper on which the toners have been fixed is output to a paper-outputting section 1055.

Figure 3:
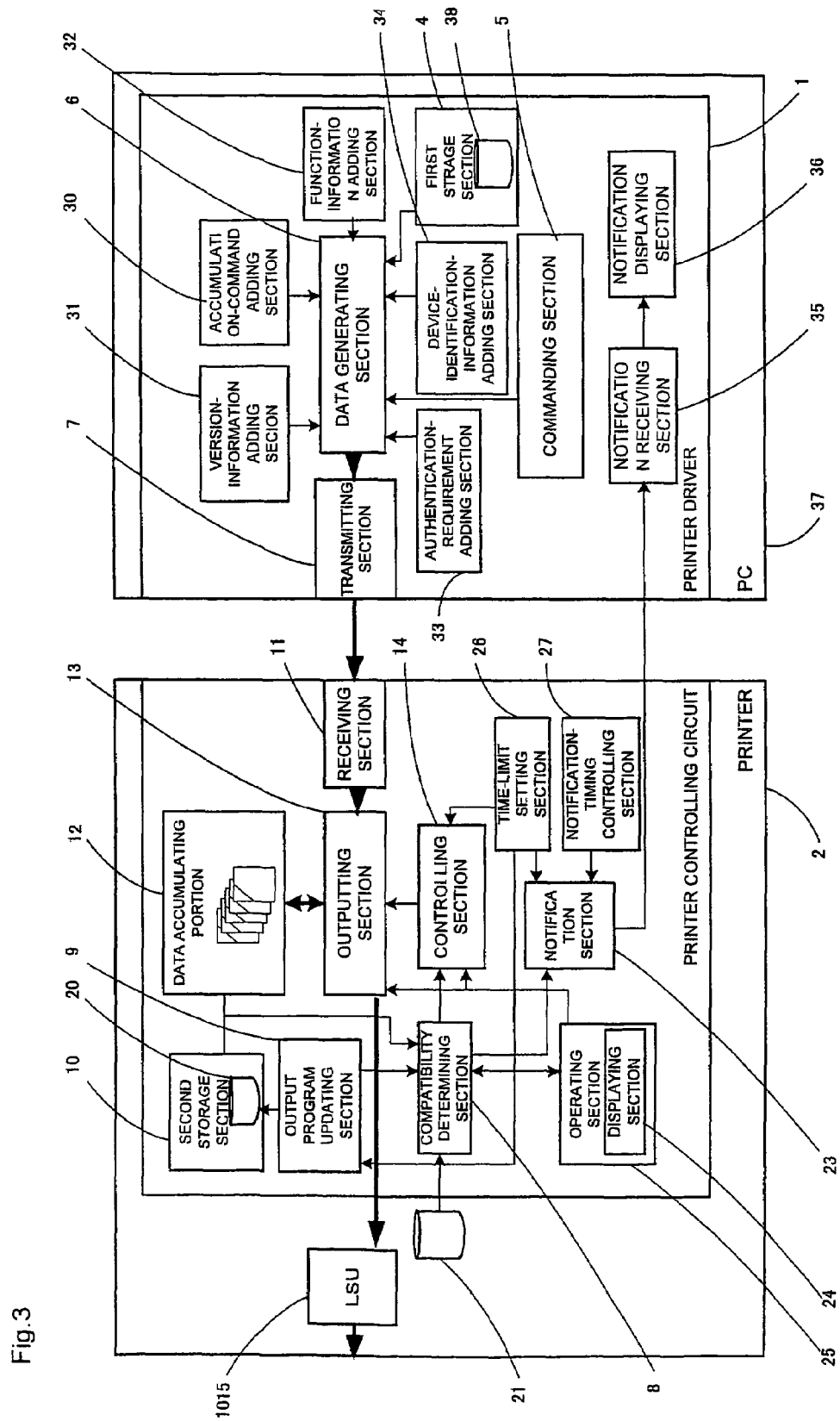
FIG. 3 is a block diagram illustrating, in detail, the structure of the respective blocks in a printing system according to an embodiment of the present invention.

FIG. 3 is a block diagram illustrating in detail the structure of respective blocks in a printing system which is an aspect of the present invention. In FIG. 3, a printer driver 1, which is the data generating device, is installed in a personal computer (hereinafter, referred to as a PC) 37. When a user of the PC 37 generates a command for printing data through a user interface that is not shown, the commanding section 5 detects the command and outputs a generation command. In response to the generation command, the data generating section 6 generates print data and respective adding sections, which are designated in the figure by reference numerals of 30 to 34, add required information to the data. Here, all the illustrated information is not necessary for the present invention. In the aspect of printing in this example, print data is accumulated once in the accumulating section and the accumulated data is output when necessary. Hereinafter, such an aspect of printing is referred to as a hold job. This aspect is applied to cases where, in order to print multiple copies, a sample print is output at first and the print data is accumulated until a command for printing is received after confirmation of the sample print (sample printing) or, in order to print confidential data, print data accompanied with a user-authentication requirement is accumulated in the printer and the user prints data after getting authenticated at the printer (confidential printing). In the case of such printing, an accumulation-command adding section 30 adds an accumulation command to print data.

The generated print data is transferred from the transmitting section 7 to, for example, a printer 2 connected to the same network as the PC 37 and then accumulated once in the data accumulating section 12 through the receiving section 11 of the printer 2. The outputting section 13 of the printer realizes this by detecting the accumulation command attached to the printer data. On the other hand, ordinary data with no accumulation command is subjected to an output process when it is received and output to the LSU 1015. Print data accumulated in the data accumulating section 12 is output as follows, in the case of sample printing, for example. The user checks a printed sample at the printer 2 and, when the user approves it, he/she causes through an operating section 25 of the printer, a sample-print approval menu to be displayed, approves the printed sample and then prints the required number of copies. After the completion of printing, the data in the data accumulating section 12 is erased. On the other hand, when the user does not approve the printed sample, he/she selects data erasure at the operating section 25 to cause the data in the data accumulating section 12 to be erased. When the user conducts printing again, he changes the setting of printing on the PC 37 and then conducts printing as a new job.

When updating the program for the outputting section 13 under conditions where print data of some hold jobs is accumulated in the data accumulating section 12, the version of the program for the printer driver which generated the print data must be compatible with the version of the updated output program in order to achieve normal printing. The compatibility determining section 8 determines the compatibility therebetween before updating of the version.

Methods for determining the compatibility will be described later in detail. Out of the accumulated print data, data maintaining compatibility may be retained as such. On the other hand, print data determined as being incompatible must be properly processed before the updating of the version, in order to ensure normal printing. Therefore, when incompatible print data is detected, the control section 14 processes the printed data, for example, by erasing or forcibly printing the print data. After the accumulated hold jobs are eliminated as a result of these operations, the output program updating section updates the version of the program.

Figure 4B:
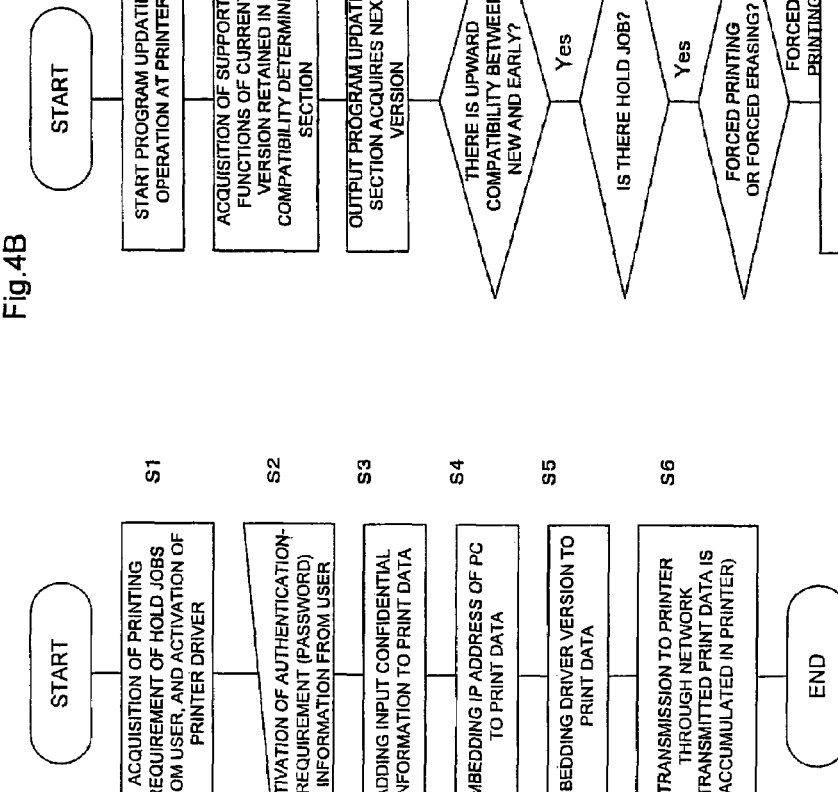
FIGS. 4A and 4B are flowcharts illustrating the aforementioned processes executed by the PC and the printer, in updating the versions of programs (first embodiment)
Figure 4A:
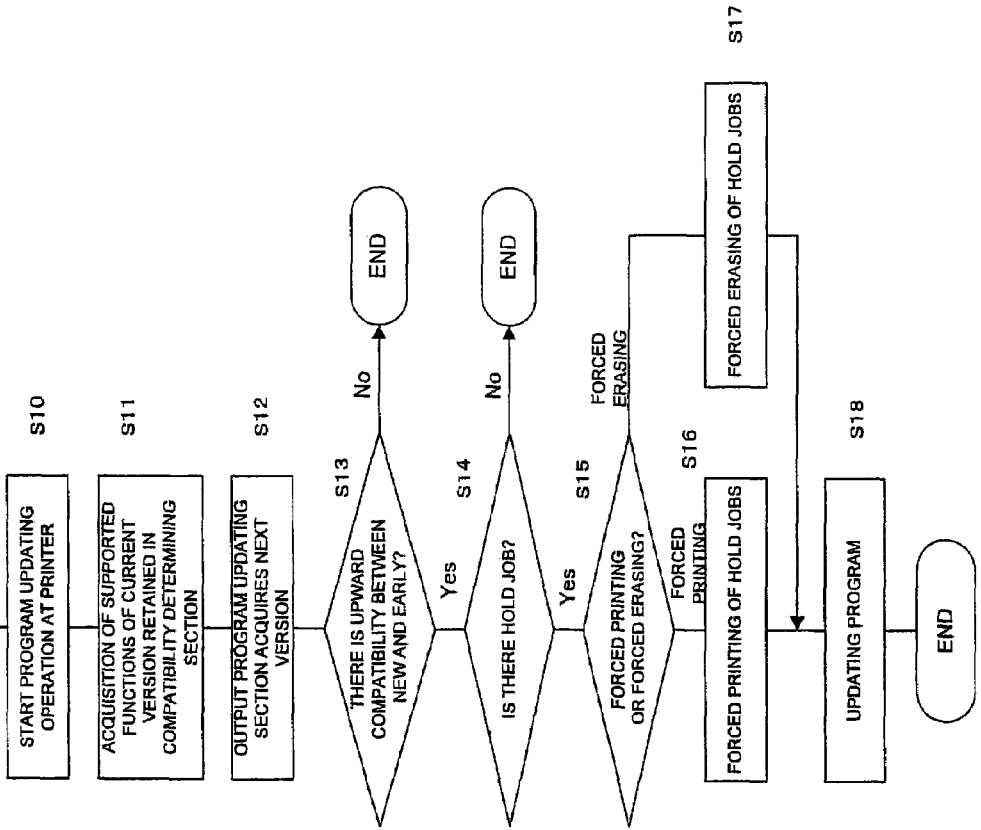

FIGS. 4A and 4B are flowcharts illustrating the aforementioned processes which are executed by the PC and the printer, before updating the version of the program. FIG. 4A illustrates the process that is executed by the PC and FIG. 4B illustrates the process that is executed by the printer. As illustrated in the figure, the PC acquires a hold-job printing requirement from the user and starts generation of print data (Step S1). The printer driver adds information to the print data (Steps S2 to S5) and transmits it to the printer (Step S6). The transmitted hold-job print data is accumulated in the printer. When updating of the version of the program in the printer is started at this state (Step S10), the compatibility determining section acquires the current version and the next version of the program (Steps S11 and S12) and determines whether or not there is compatibility therebetween (Step S13). When there is no compatibility therebetween, the compatibility determining section determines whether or not there is accumulated print data relating to compatibility (Step S14). When there is accumulated print data that corresponds thereto, the user is caused to select erasure of the data or forced printing of the data (Step S15), then the data is processed in accordance with the selection (Steps S16 and S17) and the program is updated (Step S18).

Second Embodiment

In the present embodiment, there will be described an exemplary determination method for determining the compatibility of a program to be version-updated, which is executed by the compatibility determining section.

A first determination means is as follows. The compatibility determining section 8 in FIG. 3 has information about functions supported by the current version of the output program 20. Further, the compatibility determining section 8 retains information about functions supported by respective previous versions (earlier versions). The information about these earlier versions may be retained in the compatibility determining section 8 when the output programs are stored in the second storage section 10. The compatibility determining section 8 acquires the versions of earlier programs from the information (refer to Step S11 in FIG. 4B).

There will be described now a case where the version of the output program is to be updated to F1.08, as an example. The next-version output program 21 may be, for example, stored in a flash memory mounted in a predetermined socket or may be accumulated in a predetermined storage section in a personal computer or a file server connected to the network and downloaded through the network. When the compatibility determining section 8 receives a version-updating command input from the operating section 25 of the printer 2, the output program updating section 9 acquires the version of the next-version output program 21 and the information about functions supported thereby and provides them to the compatibility determining section 8 (refer to Step S12 in FIG. 4B). This is because the information about functions supported by the new version is attached to the new-version output program. FIG. 6 is an explanation view illustrating exemplary information which the output program updating section 9 acquires from the next-version program and the compatibility determining section 8 finally acquires. As illustrated in FIG. 6, when the current version of the printer driver is V1.57 and the version of the output program which is compatible therewith is F1.07, if their versions are updated to a set of V1.58/F1.08, the functions of the printing area are updated. On the precondition that the version-updating operations for the printer driver and for the printer are concurrently performed, accumulated print data was generated by the printer driver of V1.57 and, if the print data is subjected to the outputting process by the output program of F1.08, this may cause disturbance of the image thus making it impossible to ensure normal printing, since the output program of F1.08 can not support the 1200DPI-printing function. The version-updating from F1.07 to F1.08 causes functions which have been supported to become unsupported and therefore the compatibility determining section 8 determines that all the accumulated data must be processed (referred to Step S13 in FIG. 4B).

Then, a forcibly-printing or forcibly-erasing is conducted. While, in the aforementioned example, functions which have been supported become unsupported, if the version is updated from F1.08 to F1.09, for example, the 1200DPI-printing becomes supported again. In the case where the version-updating involves only addition of functions, all data may be retained.

Further, a second determination means is as follows. Print data, as hold jobs, accumulated in the data accumulating section 12 of the printer 2 illustrated in FIG. 3 has information attached thereto which is necessary for executing the outputting process, etc. FIG. 5 is an explanation view illustrating an exemplary control table that is internally held in the printer 2 for controlling hold jobs. The contents of the table are acquired from the information attached to accumulated print data. On the other hand, a version-information adding section 31 of the printer driver 1 adds, in generating print data, the version information of the generation program 38 used for the generation process to the print data. Then, the version information of the printer driver which generated the print data is added to the hold-job controlling table in the printer. FIG. 7 is an explanation view illustrating an exemplary controlling table including the version information of the printer driver. The compatibility determining section 8 acquires the earlier-version information of the printer driver from this controlling table and acquires, from the information illustrated in FIG. 6, the output program and the information about functions supported by the printer driver of the earlier version (refer to Step S11 in FIG. 4B).

Hereinafter, there will be described a case where the output program is version-updated to F1.10. The version-updating to F1.10 involves changes in the printing area and the compatibility determining section 8 retains only data of "Management-Strategy Conference" and "Watch of Technical-Trend" generated by the compatible driver version V1.62 and determines that all the other data must be processed (refer to Step S13 in FIG. 4B).

An advantage of this determination means over the first determination means is that it is possible to acquire, from accumulated data, the version information of the programs used for generating the data, thus eliminating the necessity of concurrently version-updating the printer driver and the printer in order to correctly determine the compatibility therebetween. Even when the generation program is version-updated first and data generated at the updated version is accumulated in an outputting device which has not been version-updated, the version incompatibility therebetween can be detected and the outputting of the data can be held. Then, the aforementioned print data can be output after updating the version of the output program to establish compatibility therebetween.

Third Embodiment

When print data to be processed is forcibly printed or erased, it is possible to provide a notification about the operation.

The compatibility determining section 8 may provide such a notification by causing a display section 24 of the printer being subjected to the version-updating operation to display the notification. Also, a notification section 23 may provide such a notification to the device in which the printer drive is installed, such as the PC which generated the hold-job command.

When there is accumulated print data to be processed, the notification may have a content which indicates that the version-updating will be held until a determined time limit and urges the user to output, by the time limit, the hold jobs to be processed. This can prevent hold jobs from being erased or printed before the user expects that. The timing of the notification may be when a version-updating operation is executed, when the set time limit comes or before the set time limit comes. Further, the notification may be provided either only a single time or multiple times and, in the case of providing the notification multiple times, the notification may be provided at a predetermined time interval by using a timer. Also, the notification may be repeatedly provided at a predetermined time interval until the number of notifications reaches a predetermined number. Further, the notification may be provided when a time limit is set and when the time limit comes. The content and timing of the notification may be properly selected on the basis of the number of users, the number of devices to which printer drivers are installed, the frequency of printing, etc.

FIG. 8 to FIG. 11 are flowcharts illustrating procedures for providing notifications about operations to perform on print data, in version-updating.

Figure 8:
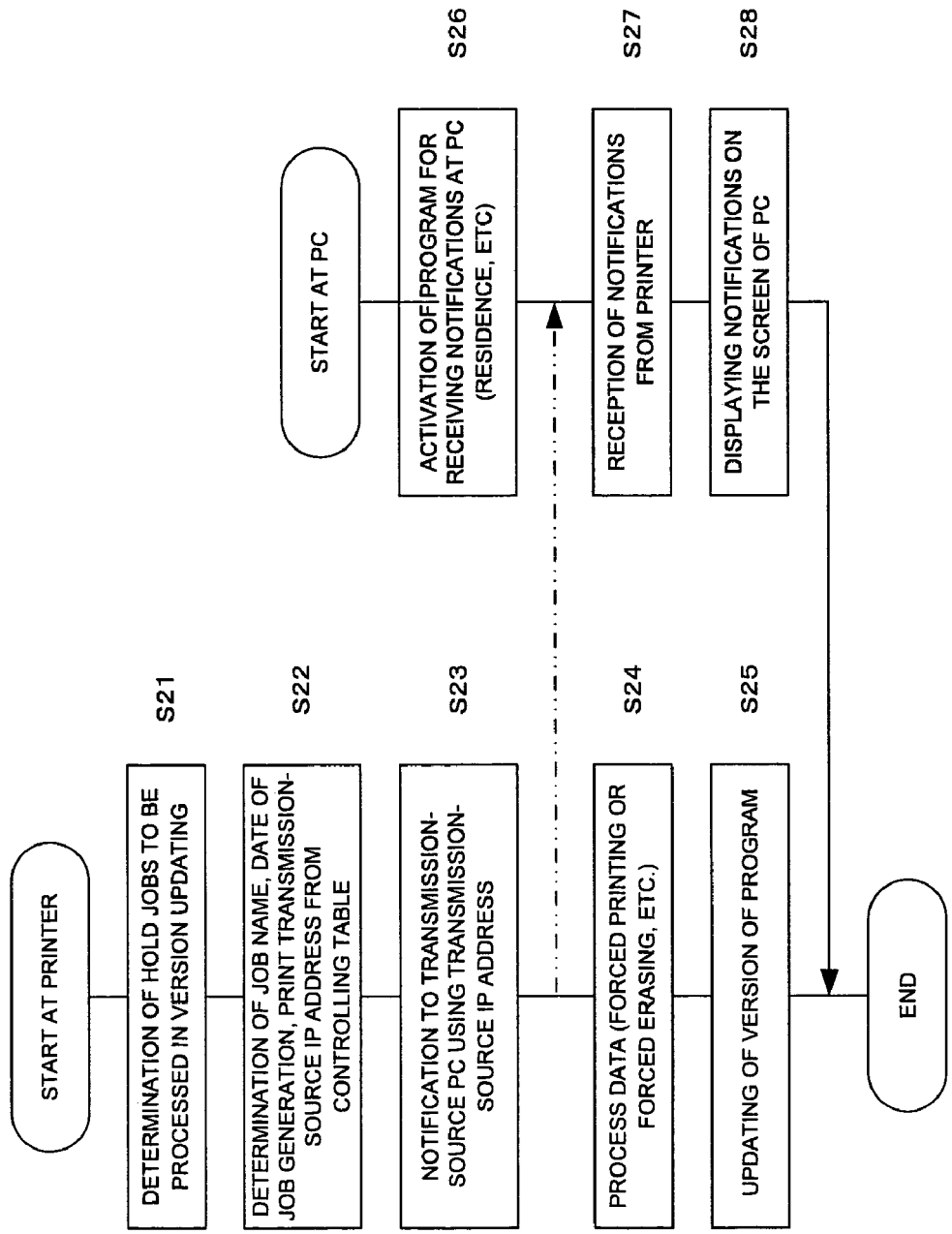
FIG. 8 is a flowchart illustrating a procedure for providing a notification of operations to perform on print data, in version updating (third embodiment)

Out of these flowcharts, FIG. 8 is a flowchart illustrating a procedure for providing a notification about an operation to perform on print data, in updating the version. At the start of version-updating, the compatibility determining section 8 of the printer 2 determines hold-job print data to be processed (Step S21). The notification section 23 acquires required information from the controlling table (Step S22) and provides a notification to the PC 37 used for generating the print data (Step S23). A chain line represents that the notification from the printer is transferred to the PC. Then, the printer 2 processes the data by erasing or forcibly printing it (Step S24) and updates the version of the program (Step S25). On the other hand, in the PC 37, an application program for receiving notifications has been activated in advance (Step S26). This application may be made resident when the PC 37 is activated. The PC 37 displays, on its screen, the notification received from the printer (Step S27) to inform the user it. FIG. 14 is an explanation view illustrating an exemplary notification massage displayed on the screen of the PC 2. As illustrated in FIG. 14, the user is informed that a hold-job of "Management-Strategy Conference Document" will be erased.

Figure 9:
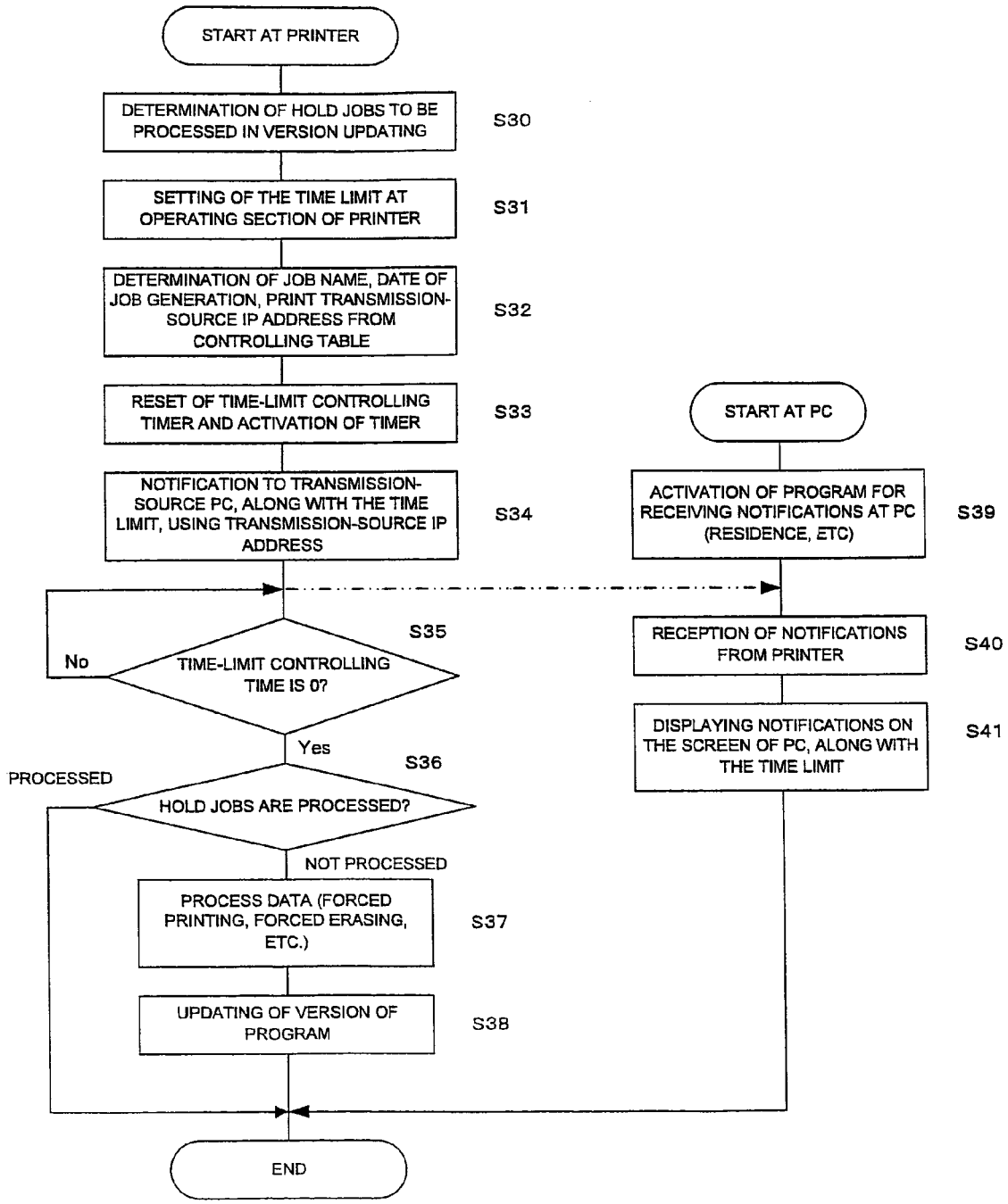
FIG. 9 is a flowchart illustrating another procedure for providing a notification of operations to perform on print data, in version updating (third embodiment)

FIG. 9 is a flowchart illustrating a procedure for holding the version updating until a time limit and providing a notification with the time limit, when updating the version. A time-limit setting section 26 of the printer 2 activates a time-limit controlling timer (Step S33) on the basis of a time limit input by the user (Step S31) in updating the version. The notification section 23 provides a notification with the time limit to the PC 37 (Step S34). The PC 37 which received the notification displays, on its screen, the notification with the time limit (Step S41). The printer waits for the time limit (Step S35), processes hold jobs (Steps S36 and S37) and then updates the program (Step S38).

Figure 10:
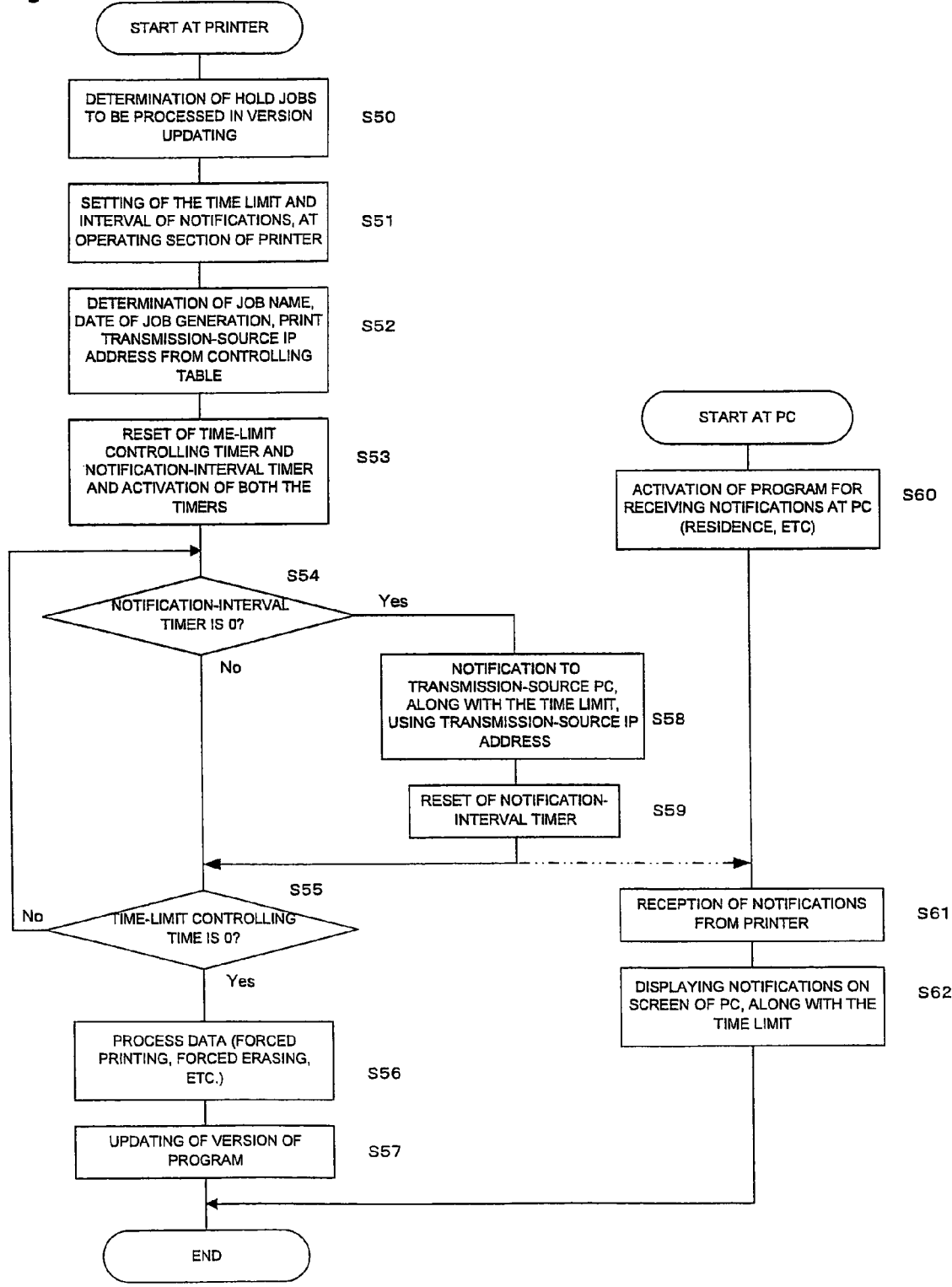
FIG. 10 is a flowchart illustrating a further procedure for providing a notification of operations to perform on print data, in version updating (third embodiment)

FIG. 10 is a flowchart illustrating a procedure for holding the updating of the version until a time limit and providing a notification with the time limit, when updating the version. A notification-timing control section 27 of the printer 2 activates a notification-timing controlling timer when a notification massage has been generated (Step S53). When the set notification timing comes (Step S54), the notification massage with the time-limit information is sent to the PC 37 (Step S58). Then, the notification-timing controlling timer is reset (Step S59) and the notification is repeatedly provided at a predetermined time interval until the time limit comes. Out of Steps S50 to S62, the processes other than the aforementioned processes correspond to the processes at Steps S30 to S41 in FIG. 9.

Figure 11:
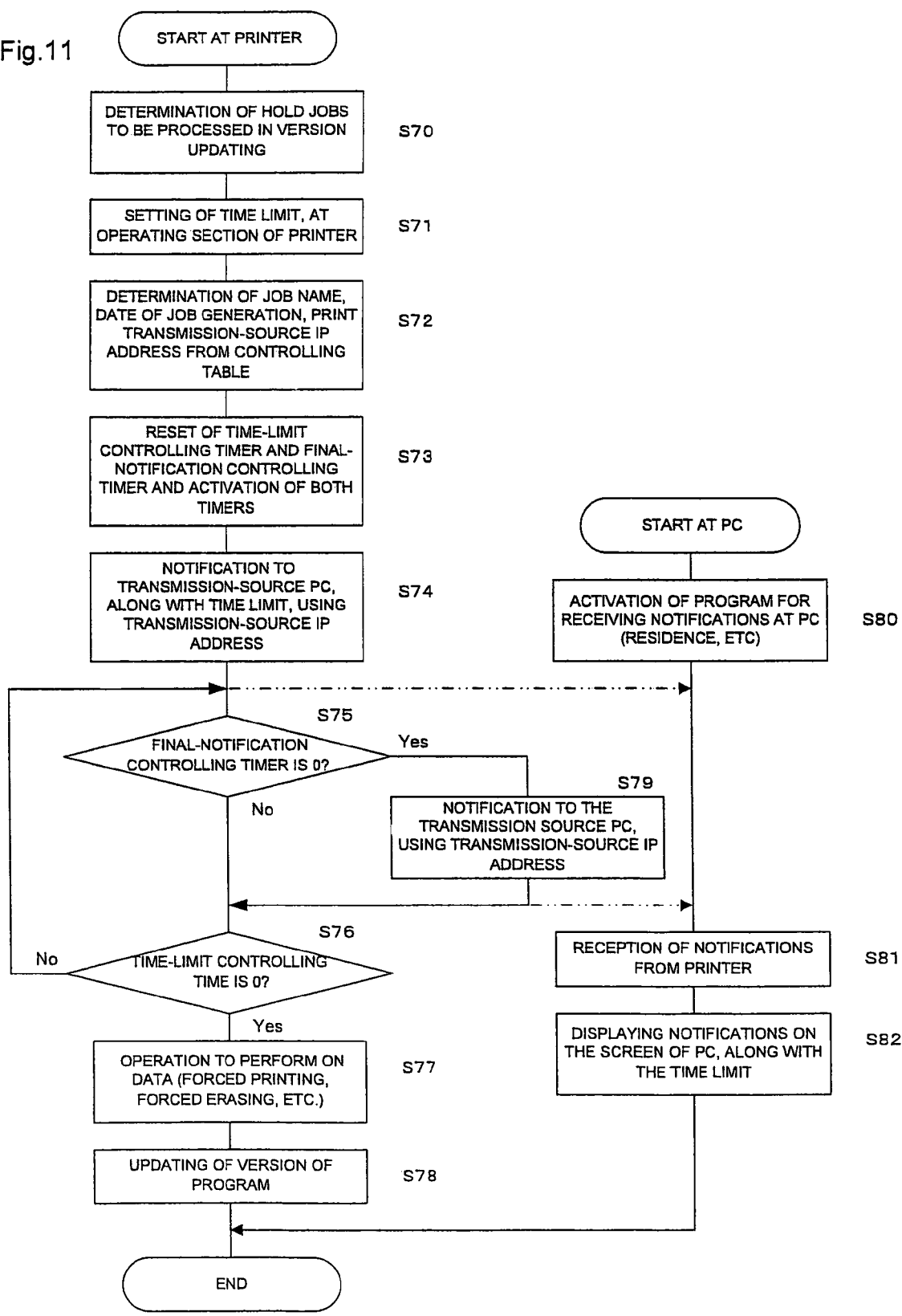
FIG. 11 is a flowchart illustrating a further procedure for providing a notification of operations to perform on print data, in version updating (third embodiment)

FIG. 11 is a flowchart illustrating a procedure for holing the version-updating until a time limit and providing a notification when the time limit is set or before the time limit comes. The time-limit setting section 26 of the printer 2 sets a time limit and the notification section 23 sends a notification with the time limit to the PC 37 (Step S74). At the same time, the notification-timing control section 27 sets a final-notification timing and activates the notification-timing controlling timer (Step S73), when a notification massage has been generated. Then, the final-notification timing is waited for (Step S75) and the notification massage is sent to the PC 37 again (Step S79). Out of Steps S70 to S82, the processes other than the aforementioned processes correspond to the processes at Steps S30 to S41 in FIG. 9.

Fourth Embodiment

In the case where confidential print data is accumulated in the data accumulating section 12, such as in the aforementioned confidential printing, when updating the version, it is not preferable that print data is forcibly and carelessly printed. In the present embodiment, when such confidential data is to be processed, the controlling section 14 excludes such confidential data from data to be forcibly printed so that it will be only erased. A notification of the erasure thereof may be provided to the user. Also, a notification indicating that updating of the version will be held until a set time limit and urging the user to print the data by the time limit may be provided.

Figure 12:
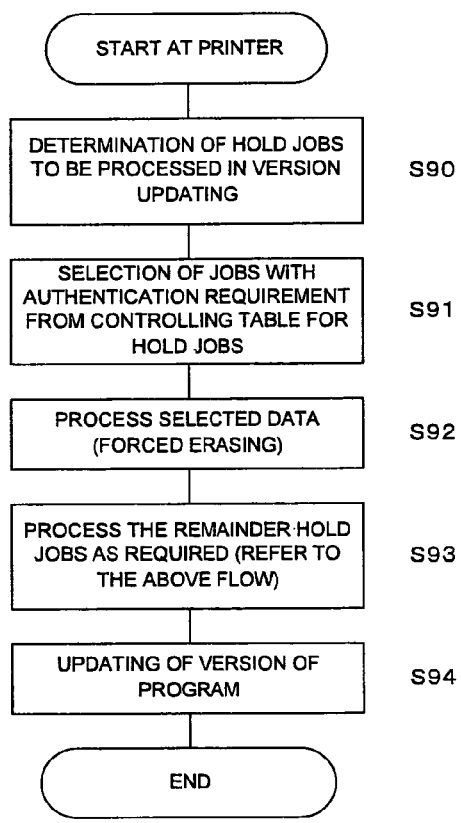
FIG. 12 is a flowchart illustrating a procedure for excluding confidential print data from data to be forcibly printed and then processing the data, in version updating.

FIG. 12 is a flowchart illustrating a procedure for excluding confidential data from data to be forcibly printed and processing the confidential print data, in updating the version. The controlling section 14 acquires and detects confidential data from the controlling table (Step S91), and erases the data (Step S92). Then, the remaining hold jobs to be processed are processed according to the aforementioned procedures (Step S93) and then the version of the program is updated (Step S94).

Figure 13:
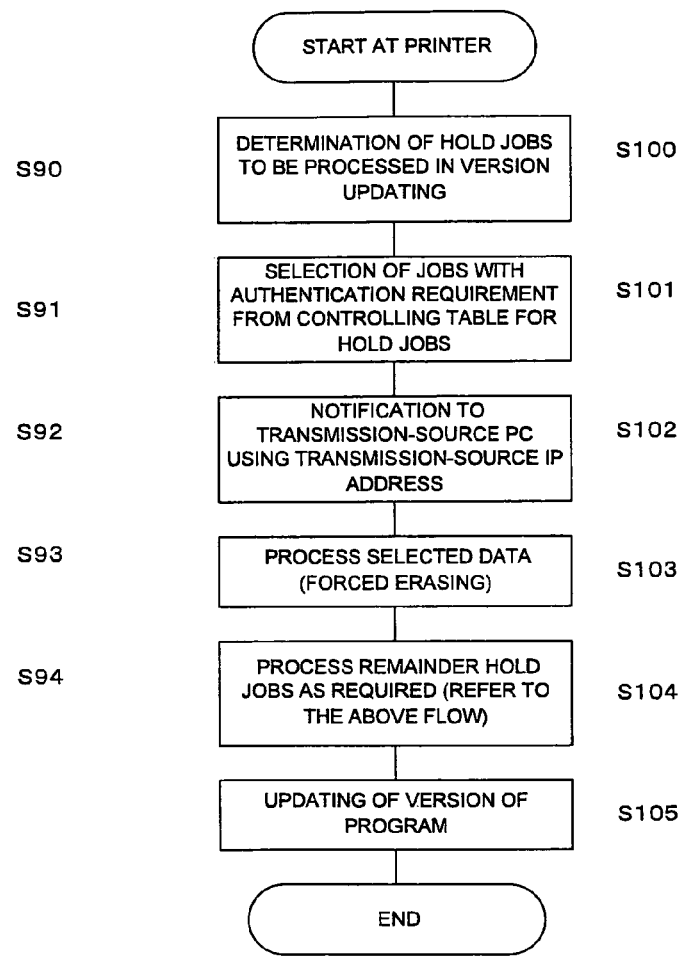
FIG. 13 is a flowchart illustrating a procedure for providing a notification before excluding confidential print data from data to be forcibly printed and processing the data, in version updating.

FIG. 13 is a flowchart illustrating a procedure for providing a notification before excluding confidential print data from data to be forcibly printed and processed, in updating the version. The controlling section 14 detects and acquires confidential data from the controlling table (Step S101) and then provides a notification of erasure of the detected data (Step S102). Then, the data is erased (Step S103). Out of Steps S100 to S105 in FIG. 13, the processes other than the aforementioned processes correspond to the processes at Steps S90 to S94 in FIG. 12.

While in the process of FIG. 13 only the notification of erasure is provided, a notification indicating that the updating of the version will be held until a set time limit and urging the user to print by the time limit may be provided. Such processes may be easily realized with reference to the process of FIGS. 9 and 13. FIG. 15 is an explanation view illustrating an exemplary notification urging the user to print confidential hold jobs by a time limit. By providing such a notification, it is possible to prevent confidential hold jobs from being erased before the user recognizes them.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data processing system comprising a data generating device and a data outputting device, wherein
the data generating device comprises:
a commanding section for generating a command for generating data;
a first storage section for storing a generation program for causing a computer to generate data;
a data generating section for generating data in accordance with the generation program executed by the computer;
a data transmitting section for transmitting the generated data; and
a generation program updating section for updating a version of the generation program from a current version to a next version, and the data outputting device comprises:
a receiving section for receiving data from the data generating devices, the receiving section being connected to one or more data generating devices through a data transferring section;
a data accumulating section for accumulating data received at the receiving section;
a second storage section for storing an output program for causing a computer to execute an outputting process that corresponds to a data generation process of the generation program;
an outputting section for processing and outputting data in the data accumulating section in accordance with the output program executed by the computer;
an output program updating section for updating the version of the output program from a current version to a next version;
a compatibility determining section for determining the compatibility between the next-version output program and data in the data accumulating section before the output program is updated; and
a controlling section for determining an operation to perform on data in the data accumulating section based on the result of the determination by the compatibility determining section,
wherein the output program updating section acquires supported function information of the next-version output program which is provided along with the program, the compatibility determining section compares the supported function information acquired by the output program updating section with supported function information of the current version output program which has been retained since the updating to the current version output program and, if supported functions of the current version output prow-ram include a function which is not supported by the next-version output program, all the data accumulated in the data accumulating section is processed.

2. The data processing system according to claim 1, wherein the data outputting device is a printer, the generation program is a program for a printer driver which generates print data to be transferred to the printer, and the output program is a print program for the printer.

3. The data processing system according to claim 1, wherein the operation determined by the controlling section includes erasure of data in the data accumulating section.

4. The data processing system according to claim 1, wherein the operation determined by the controlling section includes forced output of data in the data accumulating section in accordance with the current-version output program.

5. The data processing system according to claim 1, wherein the commanding section or the data generating section adds, to data, command information for accumulating data in the data accumulating section when a user generates an accumulation command, the receiving section accumulates the data to which the command information is added, and the outputting
    section outputs data from the data accumulating section on receiving an output command from the user.

6. The data processing system according to claim 1, wherein the data generating section adds version information of the generation program to data generated in accordance with this version of the program, the output program updating section acquires information about the compatibility between the version of the next-version output program and the version of the generation program, the information being provided along with the next-version output program, and the compatibility determining section compares the information acquired by the output program updating section with the version information of each data and judges data generated by a generation program which is incompatible with the next-version output program as being incompatible.

7. The data processing system according to claim 1, wherein the data outputting device further comprises a display section for displaying an operation to perform on data which is judged as being incompatible by the compatibility determining section.

8. The data processing system according to claim 1, wherein the data outputting device further comprises a notification section for notifying the data generating device, the commanding section or the data generating section adds, to data, identification information for identifying the data generating device which generated a command for generating the data, and the data outputting device notifies, about an operation to perform on data judged as being incompatible by the compatibility determining section, the data generating device which is identified from the identification information of this data.

9. The data processing system according to claim 8, wherein the data outputting device further comprises a time-limit setting section for determining the time limit for
    holding the processing of data, the notification section provides a notification including the set time limit, the controlling section processes the data after the time limit, and the output program updating section updates the version of the output program after the data is processed.

10. The data processing system according to claim 9, wherein the data outputting device further comprises a notification-timing control section for indicating the timing of notification, and the notification section provides a notification when the notification-timing control section indicates the timing of notification.

11. The data processing system according to claim 10, wherein the notification-timing control section causes the notification section to provide a notification at a predetermined time interval until the number of notifications reaches a predetermined number.

12. The data processing system according to claim 4, wherein
    the commanding section or the data generating section adds user-authentication requirement information to data when a user generates a user-authentication requirement command,
    the outputting section outputs the data to which the user-authentication requirement information is added, on receiving authentication from the user, and
    the controlling section excludes the data with user-authentication requirement information added thereto from the data to be forcibly output.

13. The data processing system according to claim 8, wherein the notification section provides a notification only for data to which user-authentication requirement information is added.

14. The data processing system according to claim 1, wherein the data outputting device further comprises a time-limit setting section for determining a time limit for holding the processing of data.

15. The data processing system according to claim 1, wherein the compatibility determining section determines the compatibility between the next-version output program and data in the data accumulating section before the version of the output program is updated from the current version to the next version, and if data in the data accumulating section is determined to be incompatible with the next-version output program, the data in the data accumulating section must be processed before the version of the output program is updated.

16. The data processing system according to claim 1, wherein if data in the data accumulating section is determined to be incompatible with the next-version output program, the data in the data accumulating section is either erased from the data accumulating section or forcibly printed before the version of the output program is updated.

17. A data processing system comprising a data generating device and a data outputting device, wherein
    the data generating device comprises:
    a generating section for generating a command for generating data which is to be transferred to a data outputting device and outputted, the data outputting device being connected to the generating section through a transferring section;
    a first storage section for storing a generation program for causing a computer to generate data;
    a data generating section for generating data in accordance with the generation program executed by the computer;
    a data transmitting section for transmitting the generated data; and
    an information adding section for adding, to data, information which enables the outputting device to determine whether a version of the output program for executing an outputting process is compatible with the generation process and process the data, and the data outputting device comprises:

a compatibility determining section for determining the compatibility between the next version output prow-ram and data in a data accumulating section before the output program is updated; and an output program updating section acquiring supported function information of the next version output program which is provided along with the program, the compatibility determining section compares the supported function information acquired by the output program updating section with supported function information of a current version output prow-ram which has been retained since the updating to the current version output program and, if supported functions of the current version output program include a function which is not supported by the next version output program, all the data accumulated in the data accumulating section is processed.

18. A data outputting device comprising:

a data accumulating section for accumulating data which has been generated by a data generating device and then received, the data generating device being connected to the data outputting device through a transferring section;

a second storage section for storing an output program for causing a computer to execute an outputting process that corresponds to a data generation process in the data generating device;

an outputting section for processing and outputting data in the data accumulating section in accordance with the output program executed by the computer;

an output program updating section for updating a version of the output program from a current version to a next version;

a compatibility determining section for determining the compatibility between the next-version output program and the accumulated data before the output program is updated; and a controlling section for determining an operation to perform on data in the data accumulating section based on the result of the determination by the compatibility determining section, wherein the output program updating section acquires supported function information of the next-version output program which is provided along with the program, the compatibility determining section compares the supported function information acquired by the output program updating section with supported function information of the current version output program which has been retained since the updating to the current version output program and, if supported functions of the current version output program include a function which is not supported by the next version output program, all the data accumulated in the data accumulating section is processed.

* * * * *